United States Patent
Messineo et al.

(10) Patent No.: US 9,023,303 B2
(45) Date of Patent: May 5, 2015

(54) EXTENDED OR MULTIPLE REACTION ZONES IN SCRUBBING APPARATUS

(71) Applicant: Airgard, Inc., San Jose, CA (US)

(72) Inventors: Daniel L. Messineo, Fremont, CA (US);
Robert T. LoBianco, Sunnyvale, CA (US); Mark W. Johnsgard, San Jose, CA (US)

(73) Assignee: Airgard, Inc., San Jose, CA (US)

( * ) Notice: Subject to any disclaimer, the term of this patent is extended or adjusted under 35 U.S.C. 154(b) by 0 days.

(21) Appl. No.: 14/213,973

(22) Filed: Mar. 14, 2014

(65) Prior Publication Data

US 2014/0308186 A1 Oct. 16, 2014

Related U.S. Application Data

(60) Provisional application No. 61/812,206, filed on Apr. 15, 2013.

(51) Int. Cl.
| | |
|---|---|
| *B01D 53/38* | (2006.01) |
| *B01D 53/74* | (2006.01) |
| *F23G 7/06* | (2006.01) |
| *B01D 53/18* | (2006.01) |
| *B01D 53/78* | (2006.01) |

(52) U.S. Cl.
CPC ......... *B01D 53/38* (2013.01); *B01D 2258/0283* (2013.01); *B01D 2258/0216* (2013.01); *F23G 7/06* (2013.01); *B01D 53/18* (2013.01); *B01D 53/78* (2013.01)

(58) Field of Classification Search
CPC .................. B01D 53/38; B01D 53/74; B01D 2258/0216; B01D 2258/0283; F23G 7/06

USPC .......... 423/210, 240 R; 422/7, 168, 169, 170, 422/172

See application file for complete search history.

(56) References Cited

U.S. PATENT DOCUMENTS

| | | | |
|---|---|---|---|
| 4,395,390 A | 7/1983 | Desgrandchamps | |
| 5,123,836 A * | 6/1992 | Yoneda et al. | 431/5 |
| 5,510,093 A * | 4/1996 | Bartz et al. | 423/240 R |
| 5,955,037 A * | 9/1999 | Holst et al. | 422/171 |
| 6,673,323 B1 | 1/2004 | Bhatnagar | |
| 7,854,792 B2 | 12/2010 | Johnsgard | |
| 2002/0018737 A1* | 2/2002 | Holst et al. | 422/171 |
| 2004/0191142 A1* | 9/2004 | Takemura et al. | 423/9 |
| 2006/0233688 A1 | 10/2006 | Barckholtz | |
| 2007/0212288 A1* | 9/2007 | Holst et al. | 423/240 R |
| 2008/0038171 A1 | 2/2008 | Johnsgard | |
| 2011/0076211 A1* | 3/2011 | Johnsgard | 423/210 |
| 2012/0037003 A1 | 2/2012 | Johnsgard | |

* cited by examiner

*Primary Examiner* — Timothy Vanoy
(74) *Attorney, Agent, or Firm* — Gard & Kaslow LLP

(57) ABSTRACT

Some industrial or fabrication processes generate effluent gas streams that require scrubbing. Scrubbing may include the use of one or more gases to abate the effluents for safer release into the environment. Systems and methods described herein provide a liquid-enclosed reaction chamber where an extended reaction zone or more than one reaction zone is formed. By having an extended reaction zone or more than one reaction zone, the effluent gas stream and the products of upstream reaction zones can be more completely abated. The reaction zones are formed by adding one or more gas ports into the reaction chamber downstream of a main burner nozzle.

24 Claims, 5 Drawing Sheets

EXTENDED OR MULTIPLE REACTION ZONES IN SCRUBBING APPARATUS

This patent application claims priority to and the benefit of U.S. Provisional Application No. 61/812,206 filed Apr. 15, 2013 and entitled "Wet Wall Burn Technology" which is hereby incorporated in its entirety herein by reference.

BACKGROUND

1. Field

This patent application relates generally to control and containment of gases and more specifically to generating extended and/or multiple reaction zones in a scrubbing apparatus.

2. Description of Related Art

A variety of industrial processes create gas streams that must be scrubbed of contaminants before being released to the outside world. The manufacture of electronics, solar cells, display devices, communications devices, metals, ceramics, and polymers, as well as the processing of chemicals, drugs, and other materials, often requires the use of exhaust gas scrubbers. Scrubbers typically receive a substantially gaseous exhaust stream (sometimes containing fine particles) and remove contaminants from the gas stream before the stream is released to the environment.

Exhaust streams from electronic fabrication processes may include a variety of contaminants, including but not limited to perfluorocarbon (PFC) etch gases such as $SF_6$, $NF_3$, $CF_4$, $C_2F_6$, $C_4F_8$, $COF_2$, and $C_4F_6$. Exhaust streams may include toxic hydrides such as $AsH_3$, $PH_3$, $P_2H_4$, or $B_2H_6$. Exhaust streams may also contain pyrophoric or flammable gases such as $SiH_4$, $H_2$, $Si_2H_6$, $GeH_4$, and gases such as $WF_6$, $SiF_4$, $HCl$, $BCl_3$, $Cl_2$, $TiCl_4$, $F_2$, $HF$, and various chlorosilanes.

Other industrial processes may also create toxic polluting exhaust streams particular to a material or manufacturing process. Volatile organic compounds (VOCs) may be present in various petroleum refining processes, chemical reaction processes, or other organic synthesis reactors. Room or chamber ventilation (e.g., of a spray painting facility or an environment containing microbes or viruses) may also require exhaust gas scrubbing or the use of other abatement systems.

Many contaminants require specific scrubbing procedures. Contaminants such as $HCl$, $Cl_2$, and $BCl_3$ are often soluble in water, and may often be removed using so-called wet scrubbers. Contaminants such as $SiCl_4$, $SiH_2Cl_2$, $NH_4F$, $WF_6$, $WCl_4$, and $TiCl_4$ (herein "water-reactive" contaminants) may or may not dissolve in water, depending upon various conditions. These contaminants may also react with water to form solid reaction products, which may clog various flow paths.

Another category of contaminants includes "water-insoluble" contaminants such as $SiH_4$, PFCs such as $CF_4$ and $C_2F_6$, $SF_6$, and $NF_3$. Among other deleterious characteristics, many of these contaminants are characterized by a "global warming potential," which may be hundreds or thousands of times stronger than that of $CO_2$ and reflecting a much stronger behavior as a greenhouse gas in the Earth's atmosphere.

Some contaminants are often abated by combusting the contaminant to form water-soluble reaction products that are then removed by wet scrubbing. Sometimes, such combustion requires high temperatures. For example, $NF_3$ may be combusted at temperatures above 900 degrees Celsius; $CF_4$ may be combusted at temperatures over 1200 degrees Celsius. Other contaminants such as $SiH_4$ may sometimes be reacted simply by exposing the contaminant to an oxygen source.

Water-insoluble, thermally decomposed contaminants may form reaction products (e.g., $HF$) that may be removed by wet scrubbing the reacted gas stream. Other water-insoluble contaminants (e.g., $SiH_4$) may form reaction products that include solid species (e.g., $SiO_2$), when thermally reacted.

Generally, solid species in a waste stream may be present as fine particles in a liquid phase (e.g., water associated with a scrubber), in the gas phase, deposited on a solid surface, or in other ways. These solid species may also nucleate directly on various surfaces. While the formation of solid reaction products may enable certain removal methods (e.g., filtration), these species may also deposit on and clog various lines, inlets, passages, surfaces, and other aspects of the system, reducing the system's efficiency or stopping its operation.

Some gas streams may include a variety of contaminants, including water-soluble, water-reactive, and water-insoluble contaminants. Scrubbing such a mixed gas stream may be particularly challenging. Many processes also create one type of contaminant during one step and another type of contaminant in another step. For example, the exhaust gas stream associated with a deposition tool may include $SiCl_4$ during a deposition step, requiring abatement of $SiCl_4$. The tool may be cleaned with a PFC during a cleaning step, and thus require abatement of the PFC. A preferred abatement system would abate all gas streams exiting a tool, and so an exemplary abatement system might be required to abate both $SiCl_4$ and the PFC.

For gas streams including a variety of contaminants, effective scrubbing may require multiple systems, such as a wet scrubber to remove water-soluble contaminants combined with a combustion chamber to combust water-insoluble contaminants. Often, the presence of one contaminant may impede the ability of a system to remove another contaminant, and for contaminants that form solid reaction products, deposition of these reaction products can be a significant problem, particularly with "downstream" systems. For example, PFCs may be removed by combustion processes in a combustion chamber, but if the incoming gas stream also contains corrosive contaminants (e.g., $HCl$), the materials in the combustion chamber may be attacked the corrosive contaminants during combustion of the PFC. Additionally, combustion of the PFC may yield combustion products (e.g., $F_2$, $HF$ or even $OF_2$) that may themselves be toxic, corrosive, and requiring of additional abatement. Combustion of $SiH_4$ may yield solid $SiO_2$ particles, which may deposit on various surfaces and clog the apparatus. Corrosion of reactor components and particle accumulation on reactor surface can degrade abatement system performance. Additionally, water-soluble contaminants in the gas stream entering the combustion chamber may deposit, corrode, or otherwise degrade components of the combustion chamber. Often, a preferred system or method for abating a first contaminant in a mixed gas stream creates a problem in a subsequent system for abating a second contaminant. Surface corrosion and surface deposition within the combustion chamber can cause the chemical dynamics to change over time and exposure, thereby causing the abatement characteristics of the combustion chamber to change.

SUMMARY

According to an example embodiment, a system comprises an enclosed vessel defined by a wall having an inner surface;

a reservoir configured to deliver a liquid to the inner surface of the enclosed vessel wall so as to cause the liquid to form a liquid wall at the inner surface of the enclosed vessel wall, the formed liquid wall defining a liquid-surrounded reaction chamber within the enclosed vessel; a main burner nozzle positioned at an upper end of the reaction chamber and configured to receive and convey a first gas such that the first gas creates a first reaction zone at the upper end of the reaction chamber, the first reaction zone having first abatement properties; and a secondary gas port positioned downstream of the main buffer nozzle and passing through the enclosed vessel wall, the secondary gas port configured to convey a second gas through the enclosed vessel wall and the formed liquid wall such that the second gas creates a second reaction zone in the reaction chamber downstream of the first reaction zone, the second reaction zone having second abatement properties.

According to an example embodiment, a method comprises delivering a liquid to an enclosed vessel defined by a wall having an inner surface so as to cause the liquid to form a liquid wall at the inner surface of the enclosed vessel wall, the formed liquid wall defining a liquid-enclosed reaction chamber within the enclosed vessel; receiving and conveying a first gas to an upper end of the reaction chamber via a main burner nozzle such that the first gas creates a first reaction zone in the reaction chamber, the first reaction zone having first abatement properties; and conveying a second gas through the enclosed vessel wall and the formed liquid wall via a secondary gas pore such that the second gas creates a second reaction zone in the reaction chamber downstream of the first reaction zone, the second reaction zone having second abatement properties.

DETAILED DESCRIPTION

In gas scrubbing systems, a variety of methods are used to remove harmful substances from a gas stream. One such method is combustion (i.e., burning by fire). To remove a greater proportion of the contaminants or to remove substances produced by the combustion process, further combustion processes or other reactions are performed following an initial combustion reaction.

The scrubbing system includes an enclosed vessel having a main burner nozzle at its upper end. The main burner nozzle delivers fuel and oxidizer to cause the initial combustion reaction (e.g., a flame) near the upper end. To protect the scrubbing system during the combustion process, remove solids, and prevent clogs, a liquid (e.g., water) is delivered to the enclosed vessel so as to form a liquid wall on the inside surface of the enclosed vessel. The volume surrounded by the formed liquid wall is referred to as a reaction chamber. In existing systems, only an initial combustion reaction is performed within the reaction chamber.

To more completely or more quickly remove dangerous substances from the gas stream, one or more additional gases are provided to the reaction chamber downstream of the main burner nozzle. The additional gases are delivered downstream such that further reactions in the form of extended and/or multiple reactions, including additional combustion reactions, occur in the reaction chamber. In some instances, the additional gases are used to extend the initial combustion reaction further downstream within the reaction chamber. The additional gases are provided via gas ports that convey the additional gases through the enclosed vessel wall and the formed liquid wall via tubes extending into the reaction chamber or by regulating the velocity of the additional gases. The additional gases may be fuels, oxidizers, or reactants depending on the chemical reactions to be performed in the reaction chamber.

Figure 1:
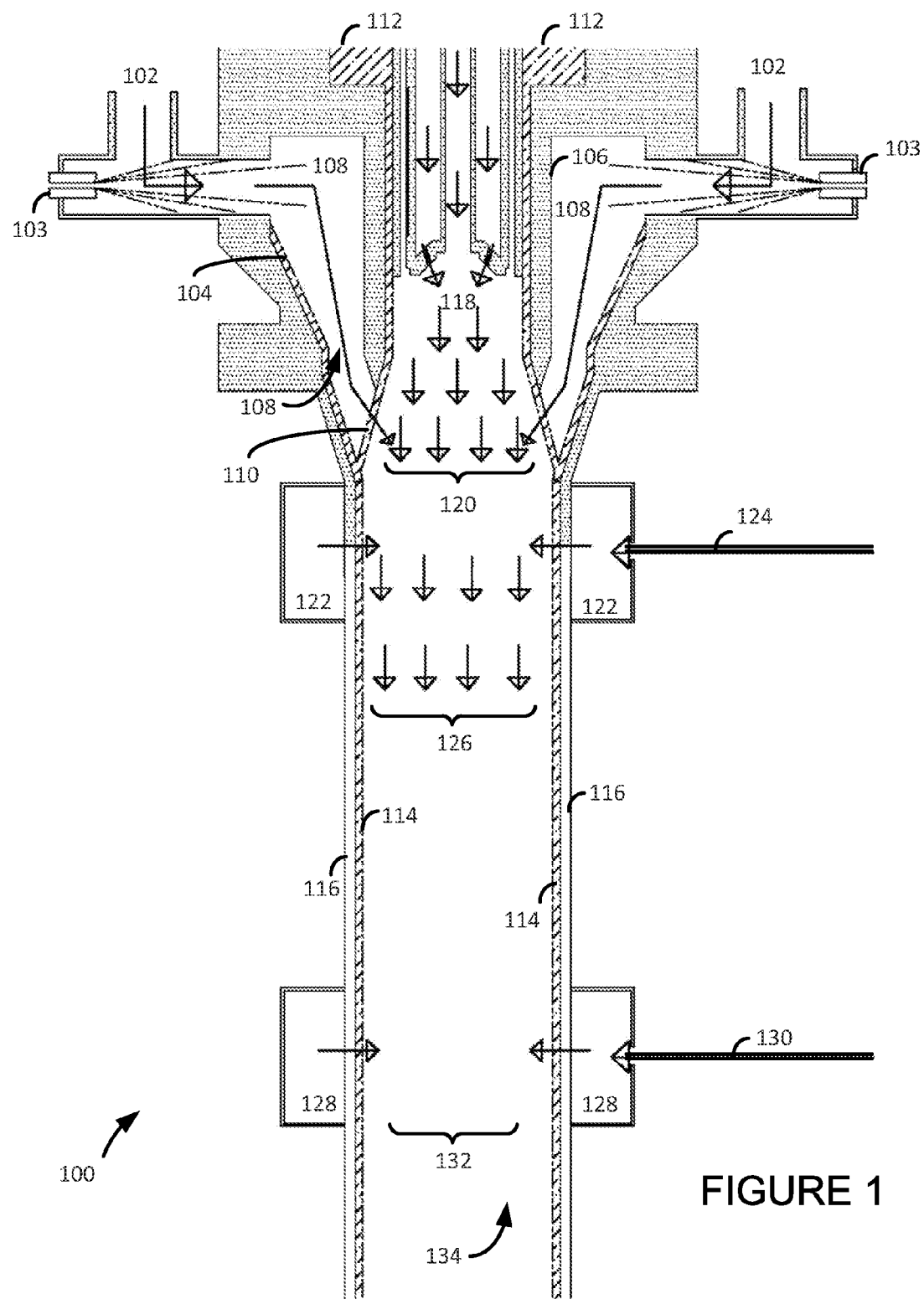
FIG. 1 is an illustration of an embodiment of an abatement system.

FIG. 1 is an illustration of an embodiment of an abatement system 100. The abatement system 100 may be used to react gas or gas streams, and in some cases may be used to react an effluent (or exhaust) gas stream 102 from an industrial process. Select embodiments include various burning apparatus, and may be used to perform combustion reactions. FIG. 1 depicts a cross section of the abatement system 100. Some embodiments of the abatement system 100 may be generally cylindrical, and the various inlets or gas ports may form an annulus about the cylinder.

The abatement system 100 may be used to create a reactive environment to react at least a portion of the gas stream 102 entering at an inlet chamber 108 having an inside wall 104 having a formed liquid wall and a wetted center wall 106. The inner wall 106 is wetted by spray from nozzles 103. The inlet chamber 108 may, from a top view (not shown), form a fluid-coated annulus about an enclosed vessel 116. At the lower area of the inlet chamber 108, a fluid valve 110 regulates the flow of the gas stream 102 into a reaction chamber 134 of the abatement system 100. One example of such a fluid valve 110 is described in commonly-owned U.S. Pat. No. 7,854,792.

The reaction chamber 134 is defined by virtue of a reservoir 112 that delivers the liquid to the walls of the enclosed vessel 116 to form liquid walls 114. The reservoir 112 contains a flowable liquid for forming the liquid wall such as water, organic liquids, solvents, or other types of liquids. The reservoir 112 may form an annulus about a main burner nozzle 118.

The reservoir 112 receives liquid from a supply line (not shown). The reservoir 112 includes a gap or a valve from which liquid flows out of the reservoir 112 to form the liquid wall 114. The flow rate of liquid into the reaction chamber 134 is such that the liquid substantially coats the inner surface of the enclosed vessel 116 walls after exiting the reservoir 112. The valve or gap may impart a tangential velocity to the liquid contained in the reservoir 112 as it leaves the reservoir 112. In such cases, the liquid wall 114 may "swirl" down the inner surface of the walls of the enclosed vessel 116. The liquid wall 114 defines the reaction chamber 134.

The abatement system 100 is used to form a first reaction zone 120 having first abatement system properties in the reaction chamber 134 to react at least a portion of the incoming gas stream 102. This first reaction zone 120 is generated when a main burner nozzle 118 delivers gases, such as a fuel and an oxidizer, to the upper end of the reaction chamber 134. As depicted, the main burner nozzle 118 may include more than one channel via which separate gases can be conveyed to the reaction chamber 134. As is apparent to those skilled in the art and as used herein, the term "gas" can refer to a particular gas or to a mixture of gases. In some instances, the main burner nozzle 118 may receive and convey a reactive gas that reacts with the incoming gas stream 102 at the first reaction zone 120. For example, some concentrations of SiH4 in the incoming gas stream 102 may be reacted by injecting oxygen, air, or other reactive gases into the reaction chamber 134. The main burner nozzle 118 may inject the reactive gas at a range of velocities. Some reactions may use low injection velocities, with which the first reaction zone 120 may be formed proximate to the main burner nozzle 118 (somewhat akin to a "pilot light" on a burner). For some reactions, the gas velocity at the main burner nozzle 118 may be selected so as to cause the first reaction zone 120 to for further from the main burner nozzle 118.

The main burner nozzle 118 may be connected to a gas supply (not shown) which provides various gases to the main burner nozzle 118. In certain embodiments, the gas supply provides methane, hydrogen, propane, natural gas, liquid alkanes, alcohols, or other combustion fuels. The gas supply may also include a source of oxidative gas such as air or oxygen. The abatement system 100 may also include an ignition source, such as a piezoelectric igniter. For incoming gas streams 102 not requiring a heat source (e.g., some gases containing SiH4), the main burner nozzle 118 may provide oxygen without additional fuel. Main burner nozzle 118 may also include an atomizer or piezoelectric injector or other apparatus to inject condensed phases such as liquid fuels into the reaction chamber 134. The main burner nozzle 118 may include and/or high velocity jets. For incoming gas stream 102 requiring combustion (e.g., some PFCs), the main burner nozzle 118 may be capable of creating a flame within the reaction chamber 134. To create the flame, the main burner nozzle 118 may include a burner, a thermal jet, a plasma generator, or a spark generator.

Downstream of the main burner nozzle 118 and the water valve 110, one or more gas ports (e.g., secondary gas port 122 and tertiary gas port 128) are configured to receive and convey gas into the reaction chamber 134. The gas ports may be connected to the gas supply that provides gas to the main burner nozzle 118 or to one or more separate gas supplies. The gas ports deliver the gas to the reaction chamber 134 so as to create further reaction zones in the reaction chamber 134 downstream of the first reaction zone created by the main burner nozzle 118. As depicted in FIG. 1, the gas ports may convey gas into the reaction chamber 134 at various positions around the cylindrical enclosed vessel 116. In some instances, the gas ports form an annulus positioned around the enclosed vessel 116.

In some instances, a secondary gas port 122 is located just downstream of the water valve 110 to create a second reaction zone 126 downstream from the first reaction zone 120 such that the second reaction zone 126 has second abatement properties. The secondary gas port 122 may receive gas from a gas supply via a secondary supply line 124. The second reaction zone 126 may react the incoming gas stream 102 and the products of the reaction occurring in the first reaction zone 120. In some embodiments, the chemical composition of the gases conveyed to the second reaction zone 126 are different from the chemical composition of the gases conveyed to the first reaction zone 120.

Because the secondary gas port 122, as depicted, is located in proximity to the main burner nozzle 118, the first reaction zone 120 and the second reaction zone 126 may be combined to create an extended reaction zone having the first abatement properties in the reaction chamber 134. The extended reaction zone is created by conveying, to the second reaction zone 126, a gas having the same chemical composition as the gas conveyed by the main burner nozzle 118. For example, if a combustion reaction is created in the first reaction zone, and oxidizers may be conveyed to the reaction chamber 134 by the secondary gas ports 122. The fuel and oxidizers may be provided so as to continue the combustion reaction occurring at the first reaction zone 120 or to change a characteristic of the combustion reaction occurring at the first reaction zone 120. For example, to maintain or extend a combustion reaction occurring in the first reaction zone 120, the secondary gas ports 122 may convey additional oxidizers to the downstream portion of the extended combustion zone.

Because the secondary gas port 122, as depicted, is located in proximity to the main burner nozzle 118, the first reaction zone 120 may be modified to create a combined reaction zone. By diverting some of the gas from the main burner nozzle 118 to the secondary gas port 122, the combined reaction zone can be expanded downstream and outward to radially extend the combined reaction zone to the liquid wall 114. Because the combined reaction zone extends radially from the longitudinal centerline of the reaction chamber 134, the gas stream 102 entering the first reaction zone 120 at the inlet chamber 108 can be more fully exposed to the reactions occurring the combined reaction zone. The radial expansion of the combined reaction zone helps ensure that the effluent gas stream does not bypass the reaction zone. By conveying the gas via the secondary gas port 122, instead of or in addition to conveying the gas via the main burner nozzle 118, the reaction in the first reaction zone 120 occurs more uniformly from the centerline of the reaction chamber 134 to the liquid wall 114. If all of the reaction gas is conveyed via the main burner nozzle 118, most of the reaction activity occurs close to the centerline of the reaction chamber 134 and diminishes outward to the liquid wall 114.

In an alternative embodiment, secondary gas port 122 instead adds to first reaction zone 120 rather creating a second reaction zone 126, by directing gas upwards with sufficient velocity towards first reaction zone 120. This gas may be the same gas provided by the main burner nozzle 118 or may be a different gas to cause some further or additional reaction to occur in first reaction zone 120. Further, depending upon the velocity required, secondary grey part 122 may comprise a tube extending through the liquid wall and pointing upstream, as described elsewhere herein.

Tertiary gas port 128 is positioned further downstream in the reaction chamber 134 than the secondary gas port 122. The tertiary gas port 128 is supplied by a gas supply line 130 and conveys gas to a third reaction zone 132 downstream from the second reaction zone 126 such that the third reaction zone 132 has third abatement system properties in the reaction chamber 134. In some instances, the tertiary gas port 128 may form part of an extended reaction zone with one or more other gas ports (e.g., secondary gas port 122 or further downstream gas ports (not shown)). In other instances, a reaction occurring in the third reaction zone 132 may be distinct from reactions occurring in other portions of the chamber such as reaction zones 120 and 126. The third reaction zone 132 may react still unreacted portions of the gas stream 102 or products of the reactions occurring in the first reaction zone the second reaction zone 126, or the extended reaction zone.

The reaction chamber 134 depicted in FIG. 1 has a secondary gas port 122 and a tertiary gas port 128. One of ordinary skill in the art will understand that additional gas ports may be added to the enclosed vessel 116 downstream of the tertiary gas port 128.

The gas conveyed by the gas ports (e.g., the secondary gas port 122 and the tertiary gas port 128) form a multi-zone reaction chamber 134 characterized by having distinct zones in which temperatures and chemical compositions can be maintained or varied allowing sequential chemical reactions to occur. This configuration allows the temperature and chemical composition of each reaction zone to be very different or very similar. Both conditions are possible.

Reaction chambers, such as reaction chamber 134, are fueled by combustible gases such as methane, natural gas, and hydrogen. The combustible gases are oxidized with pure oxygen or air. In a single-zone reaction chamber (not shown), to abate residual gases in the gas stream 102 such as NF3, CF4 and hydrogen resulting from semiconductor processes, a single reaction zone is formed by burning methane, natural gas or combustible source gases with an appropriate oxidizer. The residual gases in the gas stream 102 created by for example, a semiconductor manufacturing process, are introduced into the single reaction zone via the inlet where the residual gases react. In a single-zone reaction chamber, an operator can vary the flow of combustible gases and oxidizers to vary temperatures and residence times of the residual gases in the single reaction zone to abate the residual gases. Keeping the resident time constant, a higher level of abatement can be achieved at a higher flame temperature. However, the higher flame temperature generates more unwanted reactants, such as NOx. Therefore, it is very difficult to achieve high abatement system efficiency without generating a large amount of unwanted reactants in the single-zone reaction chamber.

A multi-zone reaction chamber 134 has more than one reaction zone. The number of zones in a multi-zone reaction chamber 134 is determined according to the requirements for the abatement system 100 to react the incoming gas stream 102. In the first reaction zone 120, a fuel is conveyed with oxygen or air such that an appropriate high gas temperature is attained at the first zone 120 to achieve a high level of abatement without excess oxygen being presented at the next zone (e.g., second reaction zone 126). This hot gas will be moved to the second reaction zone 126 where remaining residual gases in the gas stream 102, such as NF3, are reacted. Since there is no excess oxygen at the second reaction zone 126, the residual gas is abated without generating undesirable $NO_x$ gas excessively even though the destruction of the residual gas produces N2 gas when the flame temperature is high. The residual methane or natural gas and hydrogen are consumed in a third reaction zone 132 and fourth reaction zone (not shown) downstream by injecting additional oxidizer in the form of oxygen or air. It is desirable to keep the flame temperature lower in the third reaction zone 132 and the fourth reaction zone to mitigate nitrous oxides forming. The low flame temperature in these zones can be controlled by adjusting a rate of injection of the oxidizers. However, some oxidizers such as air comprise a significant amount of nitrogen. When large quantities of nitrogen are conveyed to the reaction zones (e.g., first reaction zone 120, second reaction zone 126, or third reaction zone 132), the large volume of nitrogen is heated. Since a fixed amount of heat is released at a given flow rate of fuel, air (approximately 78% nitrogen) can be used to control the temperature of the reaction zone(s). For example, when fluorocarbon gases are abated in the first reaction zone 120, and air is injected into the second reaction zone 126, the first reaction zone 120 is hot enough to decompose the fluorocarbons and the second reaction zone 126 has enough oxygen to burn the hydrogen below safe limits. The excess nitrogen cools the reactor temperature and thereby reduces the amount of harmful oxides of nitrogen formed. Varying amounts of hydrogen in the effluent gas stream requiring abatement are not typically monitored but still require adequate oxygen to react. By injecting air into the second reaction zone 126, enough oxygen is provided to react the highest volumetric level of hydrogen in the effluent gas stream while allowing the first reaction zone 120 to have adequate temperatures to decompose fluorocarbon gases using a reduced amount of fuel. By injecting air in downstream reaction zones, reaction temperatures can be controlled. Controlling the reaction temperatures, in turn, reduces oxide of nitrogen formation and increases the abatement of target gases while reducing the cost of operation of the abatement system 100.

In another example, when the abatement system 100 of the residual gases, such as hydrogen and Silane, do not require a high burning temperature, they can be abated economically by sustaining a low flame temperature. As the hydrogen or Silane flows into the low temperature flame at the second reaction zone 126, air can be fed into the third reaction zones 132 and the fourth reaction zone to burn these residual gases at low burn temperature.

When the residual gases at the second reaction zone 126 contain hydrogen as well as other gases like NF3, the flame temperature at the second reaction zone 126 stays high with minimum oxygen so that NF3 can be abated effectively and the residual hydrogen can be burned economically at the third reaction zone 132 and the fourth reaction zone with air at lower burn temperatures.

In another example, the abatement system 100, when abating some residual gases, can produce excessive amounts of nitrous oxides. By controlling the temperatures in downstream zones (such as the third reaction zone 132 and a fourth reaction zone (not shown)) to between 500 and 850° C., ammonia can be injected into those zones to decompose nitrous oxides.

From the above examples, it would be apparent to one skilled in the art that a multitude of chemistries and temperature conditions can be attained by using a multiple zone technique in the reaction chamber 134. By creating an initial flame with fuels and oxidizers, then injecting gases downstream in the process, chemical compositions as well as temperatures can be varied. As illustrated in the example of reducing nitrous oxide, by using multi-zone chemistries, unwanted reactants can be mitigated. It would be further apparent to one of skill in the art that the use of a multi-zone reaction chamber 134 can carp be used to control whether a certain reaction occurs. By eliminating the occurrence of the certain reaction, a specific chemical can remain unreacted. Instead of being reacted, the specific chemical can be diluted to a safe level.

Figure 2:
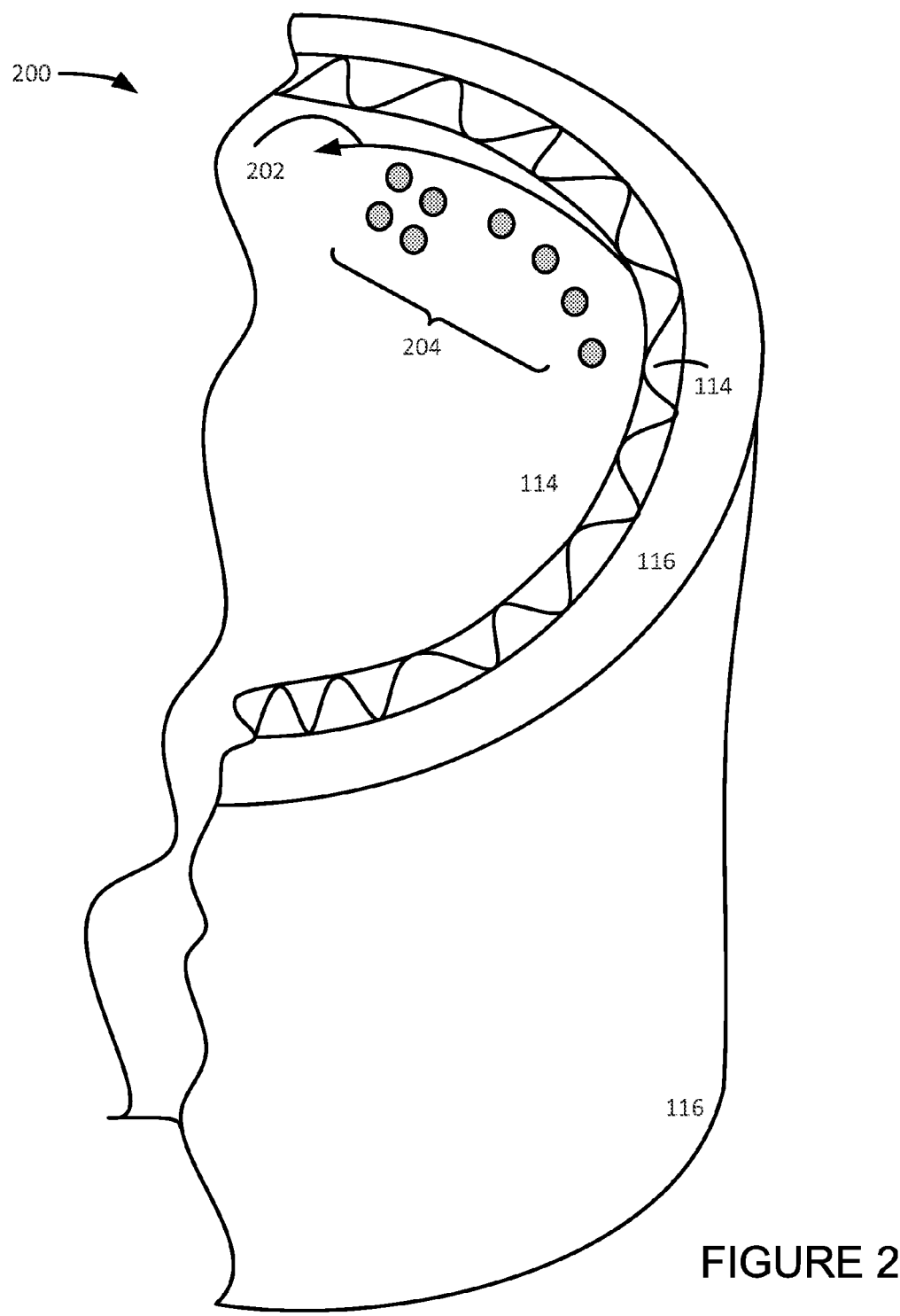
FIG. 2 depicts an example embodiment of a gas port.

FIG. 2 depicts an example embodiment of a gas port, such as secondary gas port 122 or tertiary gas port 128. FIG. 2 depicts a cross-section 200 of the enclosed vessel 116 having a formed liquid wall 114 at its inner surface. The formed liquid wall 114 swirls down the inner surface of the enclosed vessel 116 in a direction depicted by arrow 202. The formed liquid wall 114 defines the reaction chamber 134 and protects the wall of the enclosed vessel 116 from the reactions occurring therein.

The gas port 204 comprises an array of apertures extending from the reaction chamber 134 through the wall of the enclosed vessel 116. As is appreciated by those of skill in the art, the gas is conveyed through the liquid wall 114 by adjusting the velocity of the gas. The velocity of the gas is selected to be high enough so that the gas penetrates and passes through the liquid wall 114 into the reaction chamber 134. To avoid damage to the wall of the enclosed vessel 116 which might be caused by reaction occurring in the reaction chamber 134, the velocity of the gas is low enough to prevent a dry spot from forming on the inner surface of the enclosed vessel 116. These velocities ma depend on, for example, the size of the aperture, the gas being conveyed, or a pressure of the gas being conveyed.

The apertures forming the gas port 204 can be arranged in a variety of ways. In some instances, the apertures are arranged in a rectangular shape. In other instances, the apertures are arranged as a full or partial ring around the enclosed vessel 116. The number of apertures within the array is based on, for example, an amount of gas to be conveyed through the gas port 204.

As depicted, the apertures are circular but may be another shape, such as ovate or rectangular. The size of the individual apertures is based on the amount of gas to be conveyed and the ability of the formed liquid wall 114 to cover the apertures when gas is not being conveyed to the reaction chamber 134. The apertures can be set at an angle relative to the enclosed vessel 116 wall. For instance, the apertures may be angled upstream towards the upper end of the enclosed vessel 116. In some instances, the apertures are angled at approximately 45 to 60 degrees but may be angled more or less with respect to the enclosed vessel 116 wall. The apertures can be set at an acute angle relative to the enclosed vessel 116 wall so that the gas is conveyed with or against the swirling flow of the formed liquid wall 114.

Figure 3:
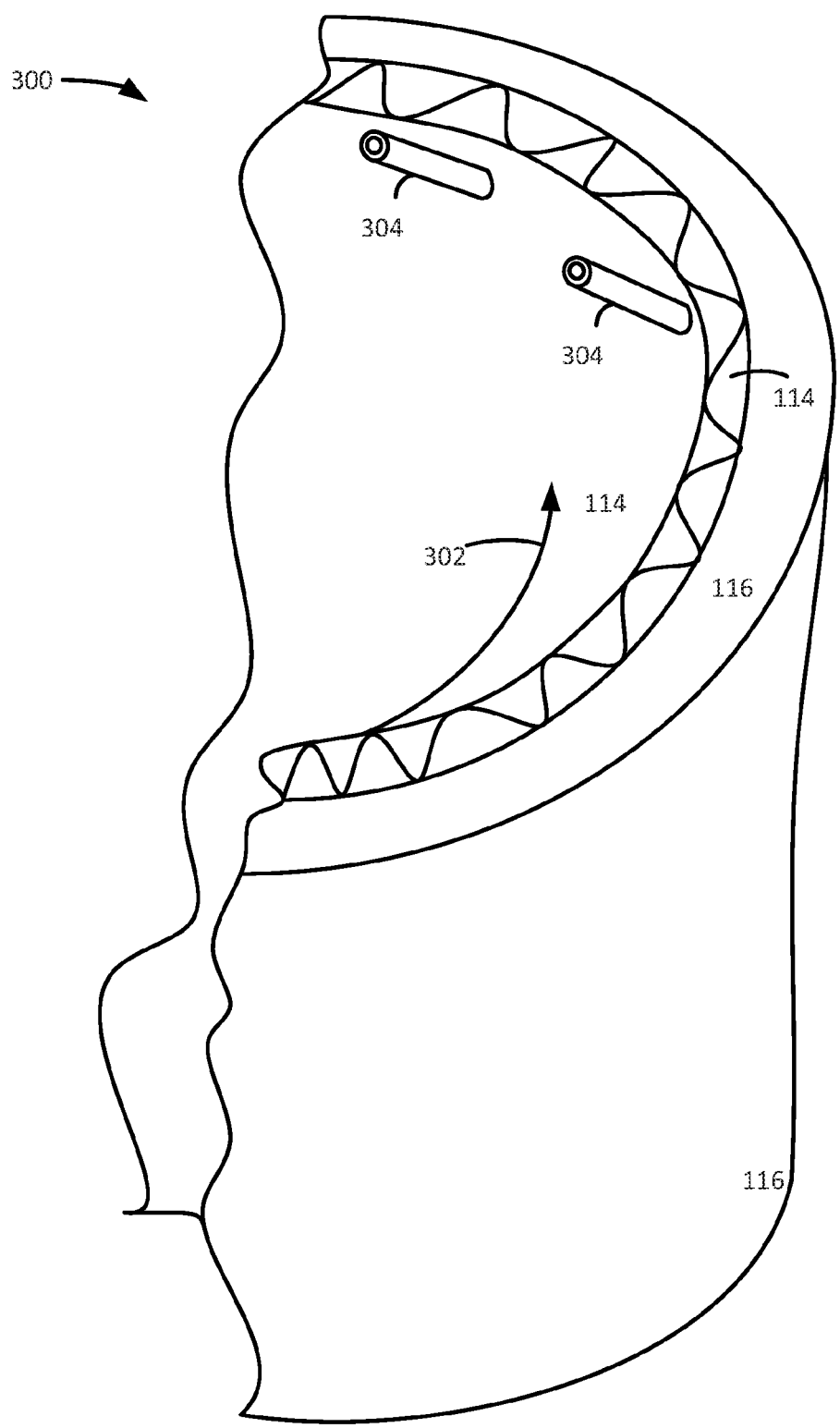
FIG. 3 depicts another example embodiment of a gas port.

FIG. 3 depicts another example embodiment of a gas port, such as secondary gas port 122 or tertiary gas port 128. Like cross-section 200, FIG. 3 depicts a cross-section 300 of the enclosed vessel 116 having a formed liquid wall 114 at its inner surface. The formed liquid wall 114 swirls down the inner surface of the enclosed vessel 116 in a direction depicted by arrow 302. The formed liquid wall 114 defines the reaction chamber 134 and protects the wall of the enclosed vessel 116 from the reactions and temperature occurring therein.

The gas port 304 comprises at least one tube extending at least from the inner surface of the enclosed vessel 116 wall and through the formed liquid wall 114 into the reaction chamber 134. The distal end of the tube can be flush with the formed liquid wall 114 or extend beyond the formed liquid wall 114 into the reaction chamber 134. The proximal end of the tube can be attached to the inner surface of the enclosed vessel 116 wall and aligned with an aperture extending through the enclosed vessel 116 wall. In other embodiments, the proximal end of the tube can extend through or be formed from the enclosed vessel 116 wall. The portion of the tube traversing the liquid wall 114 is protected from the reactions occurring in the reaction chamber 134 by the liquid wall 114.

As is appreciated by those skilled in the outer diameter of the tube is small enough to allow the formed liquid wall 114 to flow around the tube without causing a dry spot to form on the inner surface of the enclosed vessel 116 below the tube. The inner diameter of the tube is large enough to convey a sufficient amount of gas to the reaction chamber 134. In some instances, the tube is formed of a rigid material.

If the gas port 304 comprises more than one tube, the tubes can be arranged in a variety of ways. In some instances, the tubes are arranged in a rectangular shape. In other instances, the tubes are arranged as a full or partial ring around the enclosed vessel 116. The number of tubes in the gas port 304 is based on, for example, an amount of gas to be conveyed through the gas port 204.

As depicted, the tubes are circular but may be another shape, such as ovate or rectangular. Each tube can be set at an angle relative to the enclosed vessel 116 wall. For instance, each tube may be angled upstream towards the upper end of the enclosed vessel 116 at approximately 45 to 60 degrees but may be angled more or less with respect to the enclosed vessel 116 wall. Each tube can be set at an acute angle relative to the enclosed vessel 116 wall so that the gas is conveyed with or against the flow of the formed liquid wall 114.

Figure 4:
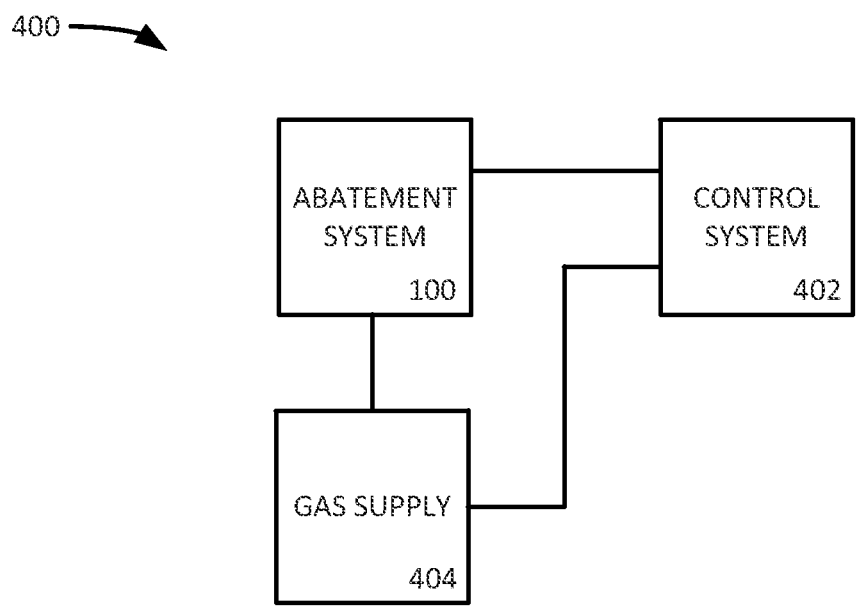
FIG. 4 is a block diagram of a system that may be used to form further reaction zones, according to one embodiment.

FIG. 4 is a block diagram of a portion of a system 400 that may be used to form further reaction zones, according to one embodiment. The system 400 comprises the abatement system 100, a control system 402, and a gas supply 404.

The control system 402 may be implemented in a variety of ways known to those skilled in the art including, but not limited to, as a computing device having a processor with access to a memory capable of storing executable instructions. The computing device may include one or more input and output components, including components for communicating with other computing devices via a network or other foam of communication. The control system 402 comprises one or more modules embodied in computing logic or executable code.

The control system 402 is configured to determine effluents in the effluent gas stream 102 to be received into the reaction chamber 134. The effluents may include gases and fine particles. The effluents may be determined based on inputs received from an operator of the system 400 that indicate, for example, the industrial processes being performed, gases used as part of the industrial processes, and contaminants resulting from the industrial processes known to be included in the effluent gas stream 102. In some instances, the industrial process may include more than one state, such as an operating state and a cleaning state. In these instances, the control system 402 is configured to determine the effluents in the effluent gas stream during each state and to identify a present state of the industrial process.

The control system 402 may be further configured to automatically determine the effluents in the effluent gas stream 102. In some instances, the control system 402 may be connected to a detection system (not shown) that is configured to detect and identify, from a sample of the effluent gas stream 102, at least a portion of the effluents in the effluent gas stream 102. In some instances, the control system 402 provides a menu of specific optimized recipes that can be changed in accordance with process tool recipe change sequences. This is facilitated by a dry contact, or software signal that starts at an upstream process tool, gas cabinet or sensor. By example, if a control valve for a specific gas is opened, a signal is generated and delivered to the abatement system 100. This signal is used to change the recipe which controls gas flow, gas type and inject location into the reaction chamber 134. Similarly if a specific gas sensor or a plurality of gas sensors sense gases upstream of the reaction chamber 134, abatement system process recipes be changed to best accommodate the effluents approaching the reaction chamber 134. As another example, if a software link via Ethernet or relay is connected between the process tool and the reaction chamber 134, signals related to various gas flows and types can be sent to the reaction chamber 134 thus allowing abatement system process recipes to be switched for best performance.

Tungsten deposition is an example process where automatically determining the effluents in the effluent gas stream 102 can be beneficial. In tungsten deposition, a mixture of gases is employed to deposit tungsten on a surface. Typically the gases employed are tungsten hexafluoride, silane, hydrogen, argon and nitrogen. Tungsten hexafluoride can be abated in room temperature sprays. Hydrogen and silane abate when exposed to air in a burn chamber operated at low temperatures in the presence of sufficient oxygen. To achieve less than a four percent concentration of hydrogen in the exhaust, slightly elevated temperatures are required. An example abatement system recipe would have low flows of fuel and oxidizer providing a low temperature chamber environment and high flows of air. This would provide optimized abatement system and costs of operation for this example.

After the tungsten deposit process, the process chamber is typically cleaned using perfluorocarbon (PFC) gas. This cleaning occurs infrequently but requires a much higher temperature to abate the PFCs flowing from the process chamber into the reaction chamber 134. In this case, the fuel and oxidizer flow rates increase to raise temperatures within the reaction chamber 134. Also, the gas flows can be directed to different reaction zones to improve efficiency of the abatement system 100 while maintaining low operating costs.

Previous designs may have one or two operational states used to abate all effluent mixtures and flows. With changing conditions, the results and operating costs of these previous designs are not optimized. One of skill in the art, based on the above description, can see how a signal from source gas valves, process chambers or inline sensors can be used to change recipes. The ability to change between recipes depending on the gas type and flows allows for a more optimized abatement system and lower operating costs. This is a forward feeding control system.

Sensors downstream of the reaction chamber 134 can be employed to monitor exhaust gas characteristics. If exhaust specification not being met, the control system 402 may switch recipes to alter the abatement properties of the reaction zones in the reaction chamber 134. For example, if excess hydrogen is exiting the reaction chamber 134, a second recipe containing additional air or oxygen can be employed to reduce the exhaust emissions. When the exhaust emissions drops below a predetermined level indicated by the exhaust specification, the amounts of air or oxygen provided to the reaction chamber 134 are no longer increased while maintaining the reactions in the reaction chamber 134. This adjustment allows the abatement system 100 to react various flow levels of the effluent gas stream 102. For example, it hydrogen is conveyed at multiple flow rates, a feedback sensor can be used to measure the content of the exhaust leaving the reaction chamber 134. The control system 402 may compare the measured content to emission limits and select a more optimized recipe for the effluent gas stream 102.

The control system 402 is further configured to specify the gases conveyed to the reaction chamber 134 by the main burner nozzle 118, the secondary gas port 122, and the tertiary gas port 128. The specification is based on the effluents determined to be in the effluent gas stream. In some instances, the specification of the gases is further based on predicted reaction products resulting from upstream reactions of the effluent gas stream. To illustrate, a combustion process occurring in the first reaction zone 120 may result in a combustion product that is reacted in the second reaction zone 126. The control system 402 then specifies the gases conveyed to the second reaction zone 126 based on the combustion product.

The control system 402, upon specifying the gases, then directs the gas to be conveyed to the main burner nozzle 118, the gas to be conveyed to the secondary gas port 122, and the gas to be conveyed to the tertiary gas port 128. The control system 402 commands valves between the gas supply 404 and the abatement system 100 such that when a valve is opened, a specified gas is conveyed to the reaction chamber 134. The control system 402 further specifies the volumetric flow at which the gas is conveyed.

The gas supply 404 contains one or more gases to be conveyed to the reaction chamber 134. The gases include fuels, oxidizers, and reactants. The gas supply 404 is connected to the abatement system 100 via a set of valves on one or more gas supply lines (e.g., supply lines 124 and 130). The valves are controlled by the control system 402.

Figure 5:
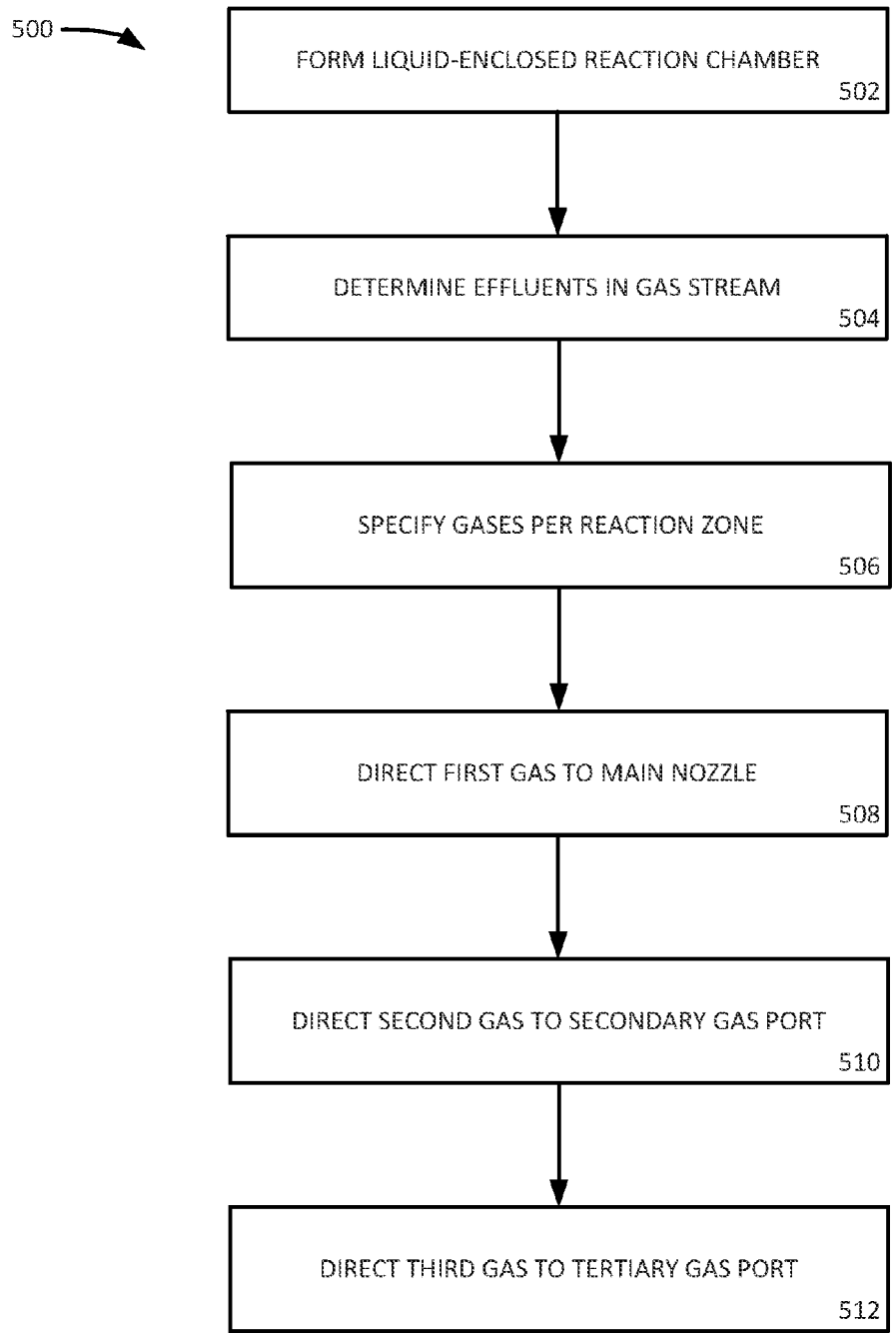
FIG. 5 is a flowchart of an example method to form the further reaction zones.

FIG. 5 is a flowchart of an example method 500 to form the further reaction zones in a reaction chamber 134. The further reaction zones are implemented to remove various effluents from an effluent gas stream. The method 500 may be performed in the abatement system 100 based on actions directed by the control system 402.

In an operation 502, a liquid-enclosed reaction chamber 134 is formed in an enclosed vessel 116 using techniques known in the art. When enclosed by liquid, the enclosed vessel 116 wall is protected from reactions and temperatures occurring in the reaction chamber 134. To enclose the reaction chamber 134 using liquid, one or more reservoirs (e.g., reservoirs 112) provide liquid in such a way as to form a liquid wall 114 at the inner surface of the enclosed vessel 116 wall.

In an operation 504, the effluents in the gas stream 102 are determined. The effluents may be determined by, for example, control system 402. The determined effluents may be received from an operator, determined based on a process that produces the effluent gas stream 102, or automatically detected by a detection system. The effluents may be further determined based on whether the effluent gas stream 102 is produced by an operating state or a cleaning state.

In an operation 506, the gases to be conveyed to each reaction zone are specified based on the reactions to be performed in each reaction zone. The control system 402 may perform operation 506. The reactions may include, for example, combustion, neutralization of acids and bases, oxidation, reduction and precipitation reactions. The gases to be conveyed may include fuels, oxidizers, and other reactants. Reactants may include ammonia. The gases to be conveyed to the reaction zones may be assigned to each reaction zone based on one or more factors. These factors may include the heat produced by the reactions, the products of the reaction, or the gases required to maintain the reaction. For example, reactions producing a large amount of heat, such as combustion reactions, may be assigned to the first reaction zone 120 or to an extended reaction zone combining the first reaction zone 120 and the second reaction zone 126.

In an operation 508, a first gas is directed to the main burner nozzle 118 by, for example, the control system 402, to cause the first reaction zone to have first abatement properties. The first gas may be conveyed in such a way as to regulate flow, concentration, or form a mixture of more than one gas. The first gas may be a fuel so that a combustion reaction occurs in the first reaction zone.

In an operation 510, a second gas is directed to the secondary gas port 122 by, for example, the control system 402. The second gas may be conveyed in such a way as to regulate flow, concentration, or form a mixture of more than one gas. The second gas may have the same chemical composition as the first gas of operation 508. In these instances, the first reaction zone 120 and second reaction zone 126 may combine to form an extended reaction zone having abatement properties of the first reaction zone 120. In some embodiments, the second gas may have a chemical composition that is different from the first gas. In these embodiments, the first reaction zone 120 has first abatement properties and the second reaction zone 126 has second abatement properties.

In an operation 512, a third gas is directed to the tertiary gas port 128 by, for example, the control system 402. The third gas may be conveyed in such a way as to regulate flow, concentration, or form a mixture of more than one gas. The gas conveyed via the tertiary gas port 128 forms the third reaction zone 132. The tertiary gas port 128 and the third reaction zone 132 are optional.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used, as well as possibly different types of air scrubbing systems.

Further, it should also be appreciated that the described method and apparatus can be implemented in numerous ways, including as a process, an apparatus, or a system. The methods described herein may be implemented by, for example, the control system 402 having a non-transitory computer-readable memory having instructions embodied thereon for instructing a processor to perform such methods. The instructions can be recorded on a computer readable storage medium such as a hard disk drive, floppy disk, optical disc such as a compact disc (CD) or digital versatile disc (DVD), flash memory, etc., or transmitted over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit ad scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system comprising;
an enclosed vessel defined by a wall having an inner surface;
a reservoir configured to deliver a liquid to the inner surface of the enclosed vessel wall so as to cause the liquid to form a liquid wall at the inner surface of the enclosed vessel wall, the formed liquid wall defining a liquid-enclosed reaction chamber within the enclosed vessel;
a main burner nozzle positioned at an upper end of the reaction chamber and configured to receive and convey a first gas such that the first gas creates a first reaction zone at the upper end of the reaction chamber, the first reaction zone having first abatement properties;
a secondary gas port positioned downstream of the main burner nozzle and passing through the enclosed vessel wall, the secondary gas port configured to convey a second gas through the enclosed vessel wall and the formed liquid wall such that the second gas creates a second reaction zone in the reaction chamber downstream of the first reaction zone, the second reaction zone having second abatement properties; and
a tertiary gas port positioned downstream of the secondary gas port and passing through the enclosed vessel wall, the tertiary gas port configured to convey a third gas through the enclosed vessel wall and the formed liquid wall such that the third gas creates a third reaction zone in the reaction chamber downstream of the second reaction zone.

2. A system comprising:
an enclosed vessel defined by a wall having an inner surface;
a reservoir configured to deliver a liquid to the inner surface of the enclosed vessel wall so as to cause the liquid to form a liquid wall at the inner surface of the enclosed vessel wall, the formed liquid wall defining a liquid-enclosed reaction chamber within the enclosed vessel;
a main burner nozzle positioned at an upper end of the reaction chamber and configured to receive and convey a first gas such that the first gas creates a first reaction zone at the upper end of the reaction chamber, the first reaction zone having first abatement properties; and
a secondary gas port positioned downstream of the main burner nozzle and passing through the enclosed vessel wall, the secondary gas port configured to convey a second gas through the enclosed vessel wall and the formed liquid wall such that the second gas creates a second reaction zone in the reaction chamber downstream of the first reaction zone, the second reaction zone having second abatement properties, wherein the secondary gas port comprises an array of apertures in the enclosed vessel wall, each aperture pointing generally upward towards the upper end of the reaction chamber.

3. The system of claim 2, wherein the first gas and the second gas are selected based on a composition of an effluent gas stream to be received into the reaction chamber.

4. The system of claim 2, wherein the first gas and the second gas have a same chemical composition and the secondary gas port is located in proximity to the main burner nozzle such that the first reaction zone and the second reaction zone combine to create an extended reaction zone having the first abatement properties.

5. The system of claim 2, wherein the first gas has a chemical composition different from a chemical composition of the second gas such that the first abatement properties of the first reaction zone are different from the second abatement properties of the second reaction zone.

6. The system of claim 2, wherein the first gas comprises fuel and the second gas is selected from the group consisting of: fuel, oxidizer, and reactant gases.

7. The system of claim 2, wherein the secondary gas port is configured to pass the second gas at a velocity high enough to convey the second gas through the formed liquid wall.

8. The system of claim 2, wherein the secondary gas port is configured to pass the second gas at a velocity low enough to prevent a dry spot from forming on the enclosed vessel wall adjacent to the secondary gas port.

9. The system of claim 2, wherein the secondary gas port comprises at least one tube extending through the formed liquid wall.

10. The system of claim 9, wherein each tube of the at least one tube is pointed upstream and at an angle that directs the gas at an acute angle from the enclosed vessel wall.

11. A system comprising:
an enclosed vessel defined by a wall having an inner surface;
a reservoir configured to deliver a liquid to the inner surface of the enclosed vessel wall so as to cause the liquid to form a liquid wall at the inner surface of the enclosed vessel wall, the formed liquid wall defining a liquid-enclosed reaction chamber within the enclosed vessel;
a main burner nozzle positioned at an upper end of the reaction chamber and configured to receive and convey a first gas such that the first gas creates a first reaction zone at the upper end of the reaction chamber, the first reaction zone having first abatement properties;
a secondary gas port positioned downstream of the main burner nozzle and passing through the enclosed vessel wall, the secondary gas port configured to convey a second gas through the enclosed vessel wall and the formed liquid wall such that the second gas creates a second reaction zone in the reaction chamber downstream of the first reaction zone, the second reaction zone having second abatement properties; and
a control system configured to determine effluents in an effluent gas stream to be received into the reaction chamber, to specify the first gas and the second gas based on the effluents, and to direct the first gas to be conveyed to the main burner nozzle and the second gas to be conveyed to the secondary gas port.

12. A system comprising:
an enclosed vessel defined by a wall having an inner surface;
a reservoir configured to deliver a liquid to the inner surface of the enclosed vessel wall so as to cause the liquid to form a liquid wall at the inner surface of the enclosed vessel wall, the formed liquid wall defining a liquid-enclosed reaction chamber within the enclosed vessel;
a main burner nozzle positioned at an upper end of the reaction chamber and configured to receive and convey a first gas such that the first gas creates a first reaction zone at the upper end of the reaction chamber, the first reaction zone having first abatement properties;
a secondary gas port positioned downstream of the main burner nozzle and passing through the enclosed vessel wall, the secondary gas port configured to convey a second gas through the enclosed vessel wall and the formed liquid wall such that the second gas creates a second reaction zone in the reaction chamber downstream of the first reaction zone, the second reaction zone having second abatement properties; and
a control system configured to determine effluents in an effluent gas stream to be received into the reaction chamber, to specify the first gas and the second gas based on the effluents, and to direct the first gas to be conveyed to the main burner nozzle and the second gas to be conveyed to the secondary gas port.

13. A method comprising:
delivering a liquid to an enclosed vessel defined by a wall having an inner surface so as to cause the liquid to form a liquid wall at the inner surface of the enclosed vessel wall, the formed liquid wall defining a liquid-enclosed reaction chamber within the enclosed vessel;
receiving and conveying a first gas to an upper end of the reaction chamber via a main burner nozzle such that the first gas creates a first reaction zone in the reaction chamber, the first reaction zone having first abatement properties;
conveying a second gas through the enclosed vessel wall and the formed liquid wall via a secondary gas port such that the second gas creates a second reaction zone in the reaction chamber downstream of the first reaction zone, the second reaction zone having second abatement properties; and
specifying, by a control system, the first gas and the second gas based on effluents in an effluent gas stream to be received into the reaction chamber.

14. The method of claim 13, further comprising determining effluents in an effluent gas stream to be received into the reaction chamber.

15. The method of claim 13, further comprising determining effluents in an effluent gas stream exiting the reaction chamber.

16. The method of claim 13, further comprising specifying that the first gas and the second gas have a same chemical composition such that the first reaction zone and the second reaction zone combine to create an extended reaction zone having the first abatement properties.

17. The method of claim 13, further comprising specifying that the first gas has a chemical composition different from a chemical composition of the second gas so that the first abatement properties of the first reaction zone are different from the second abatement properties of the second reaction zone.

18. The method of claim 17, wherein the chemical composition of the second gas and the second abatement properties of the second reaction zone mitigate unwanted reactants produced in the first reaction zone.

19. The method of claim 13, wherein the conveyed second gas has a velocity that is high enough to convey the second gas through the formed liquid wall and low enough to prevent a dry spot from forming on the enclosed vessel wall adjacent to the secondary gas port.

20. A method comprising:
delivering a liquid to an enclosed vessel defined by a wall having an inner surface so as to cause the liquid to form a liquid wall at the inner surface of the enclosed vessel wall, the formed liquid wall defining a liquid-enclosed reaction chamber within the enclosed vessel;
receiving and conveying a first gas to an upper end of the reaction chamber via a main burner nozzle such that the first gas creates a first reaction zone in the reaction chamber, the first reaction zone having first abatement properties;
conveying a second gas through the enclosed vessel wall and the formed liquid wall via a secondary gas port such that the second gas creates a second reaction zone in the reaction chamber downstream of the first reaction zone, the second reaction zone having second abatement properties; and
conveying a third gas through the enclosed vessel wall and the formed liquid wall via a secondary gas port such that the second gas creates a third reaction zone in the reaction chamber downstream of the second reaction zone, the third reaction zone having second abatement properties.

21. The method of claim 20, wherein the third abatement properties are different from the first abatement properties and from the second abatement properties.

22. A method comprising:
delivering a liquid to an enclosed vessel defined by a wall having an inner surface so as to cause the liquid to form a liquid wall at the inner surface of the enclosed vessel wall, the formed liquid wall defining a liquid-enclosed reaction chamber within the enclosed vessel;
receiving and conveying a first gas to an upper end of the reaction chamber via a main burner nozzle such that the first gas creates a first reaction zone in the reaction chamber, the first reaction zone having first abatement properties;
conveying a second gas through the enclosed vessel wall and the formed liquid wall via a secondary gas port such that the second gas creates a second reaction zone in the reaction chamber downstream of the first reaction zone, the second reaction zone having second abatement properties; and diverting a portion of the gas from the main burner nozzle to the secondary gas port to radially expand a combined reaction zone from a centerline of the reaction chamber to the liquid wall.

23. A method comprising:
delivering a liquid to an enclosed vessel defined by a wall having an inner surface so as to cause the liquid to form a liquid wall at the inner surface of the enclosed vessel wall, the formed liquid wall defining a liquid-enclosed reaction chamber within the enclosed vessel;
receiving and conveying a first gas to an upper end of the reaction chamber via a main burner nozzle such that the first gas creates a first reaction zone in the reaction chamber, the first reaction zone having first abatement properties;
conveying a second gas through the enclosed vessel wall and the formed liquid wall via a secondary gas port such that the second gas creates a second reaction zone in the reaction chamber downstream of the first reaction zone, the second reaction zone having second abatement properties; and
controlling a temperature of a reaction in the second reaction zone by conveying air from the secondary gas port to the second reaction zone.

24. A system comprising an enclosed vessel defined by a wall having an inner surface;
a reservoir configured to deliver a liquid to the inner surface of the enclosed vessel wall so as to cause the liquid to form a liquid wall at the inner surface of the enclosed vessel wall, the formed liquid wall defining a liquid-enclosed reaction chamber within the enclosed vessel;
a main burner nozzle positioned at an upper end of the reaction chamber and configured to receive and convey a first gas such that the first gas creates a first reaction zone at the upper end of the reaction chamber, the first reaction zone having first abatement properties;
a secondary gas port positioned downstream of the main burner nozzle and passing through the enclosed vessel wall, the secondary gas port comprising at least one tube extending through the formed liquid wall and pointing upstream at an angle that directs gas at an acute angle from the enclosed vessel wall, the at least one tube configured to convey the first or a second gas through the enclosed vessel wall and the formed liquid wall such that the first or second gas adds to the first reaction zone in the reaction chamber; and
a tertiary gas port positioned downstream of the secondary gas port and passing through the enclosed vessel wall, the tertiary gas port configured to convey a third gas through the enclosed vessel wall and the formed liquid wall such that the third gas creates a second reaction zone in the reaction chamber downstream of the first reaction zone.

* * * * *

UNITED STATES PATENT AND TRADEMARK OFFICE
CERTIFICATE OF CORRECTION

PATENT NO.        : 9,023,303 B2                         Page 1 of 1
APPLICATION NO.   : 14/213973
DATED             : May 5, 2015
INVENTOR(S)       : Daniel L. Messineo et al.

It is certified that error appears in the above-identified patent and that said Letters Patent is hereby corrected as shown below:

IN THE CLAIMS

Col. 16, Claim 20, line 20, replace "second gas" with --third gas--.
Col. 16, Claim 20, line 22, replace "second abatement" with --third abatement--.
Col. 16, Claim 20, line 43, replace "secondary gas port" with --tertiary gas port--.
Col. 17, Claim 22, line 18, replace "the gas" with --the first gas--.

Signed and Sealed this
First Day of March, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,023,303 B2 | Page 1 of 1 |
| APPLICATION NO. | : 14/213973 | |
| DATED | : May 5, 2015 | |
| INVENTOR(S) | : Daniel L. Messineo et al. | |

It is certified that error appears in the above-identified patent and that said Letters Patent is hereby corrected as shown below:

In the Claims

Column 15, line 40, replace "effluent gas stream" with --exhaust gas stream--.

Signed and Sealed this
Fifth Day of July, 2016

Michelle K. Lee
*Director of the United States Patent and Trademark Office*